Feb. 18, 1930.  S. R. DAY  1,747,350
MUSICAL CHART
Filed Oct. 18, 1926  3 Sheets-Sheet 1
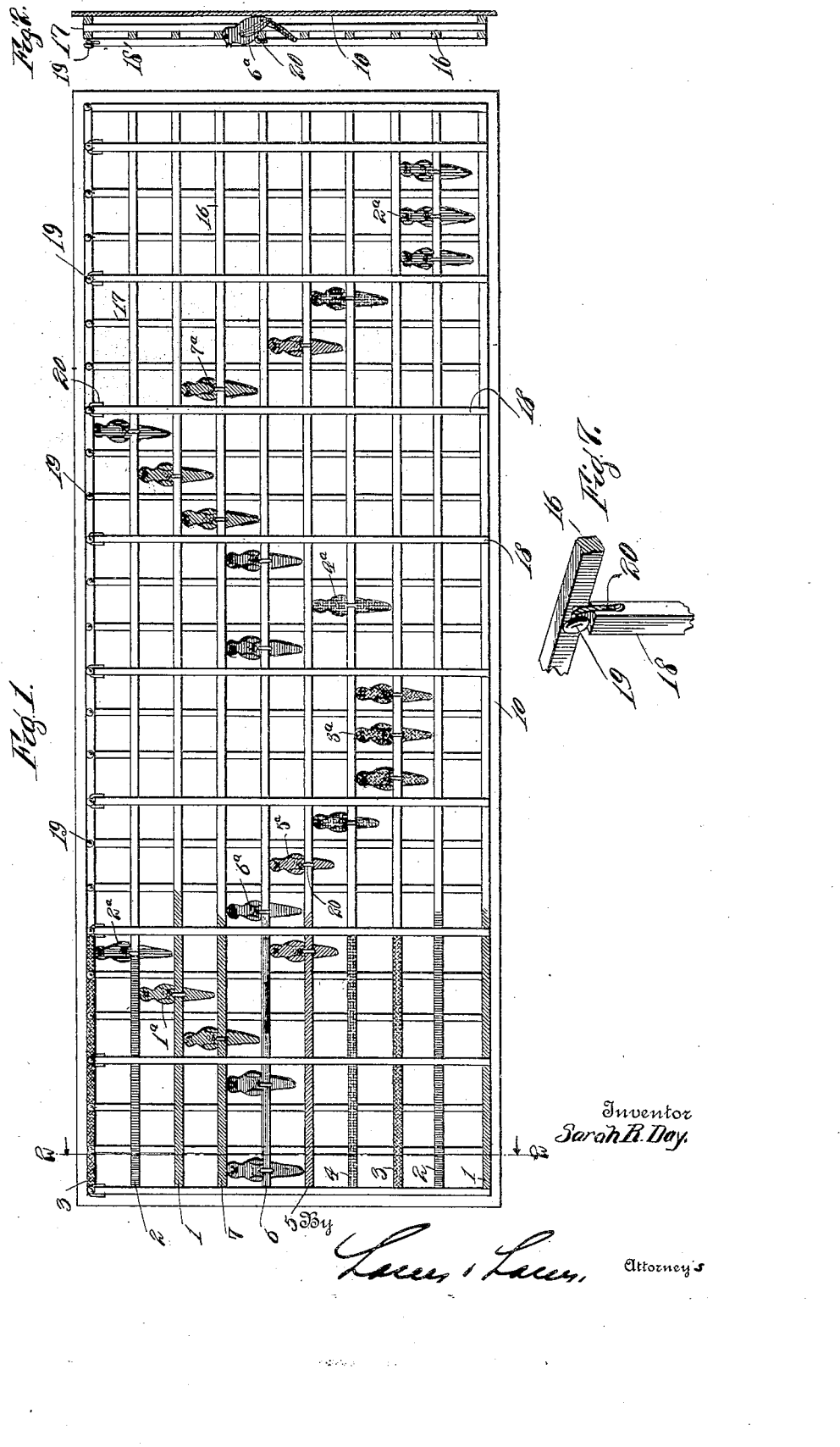
Inventor
Sarah R. Day.
By
Lacey & Lacey, Attorneys Feb. 18, 1930. S. R. DAY 1,747,350
MUSICAL CHART
Filed Oct. 18, 1926 3 Sheets-Sheet 2
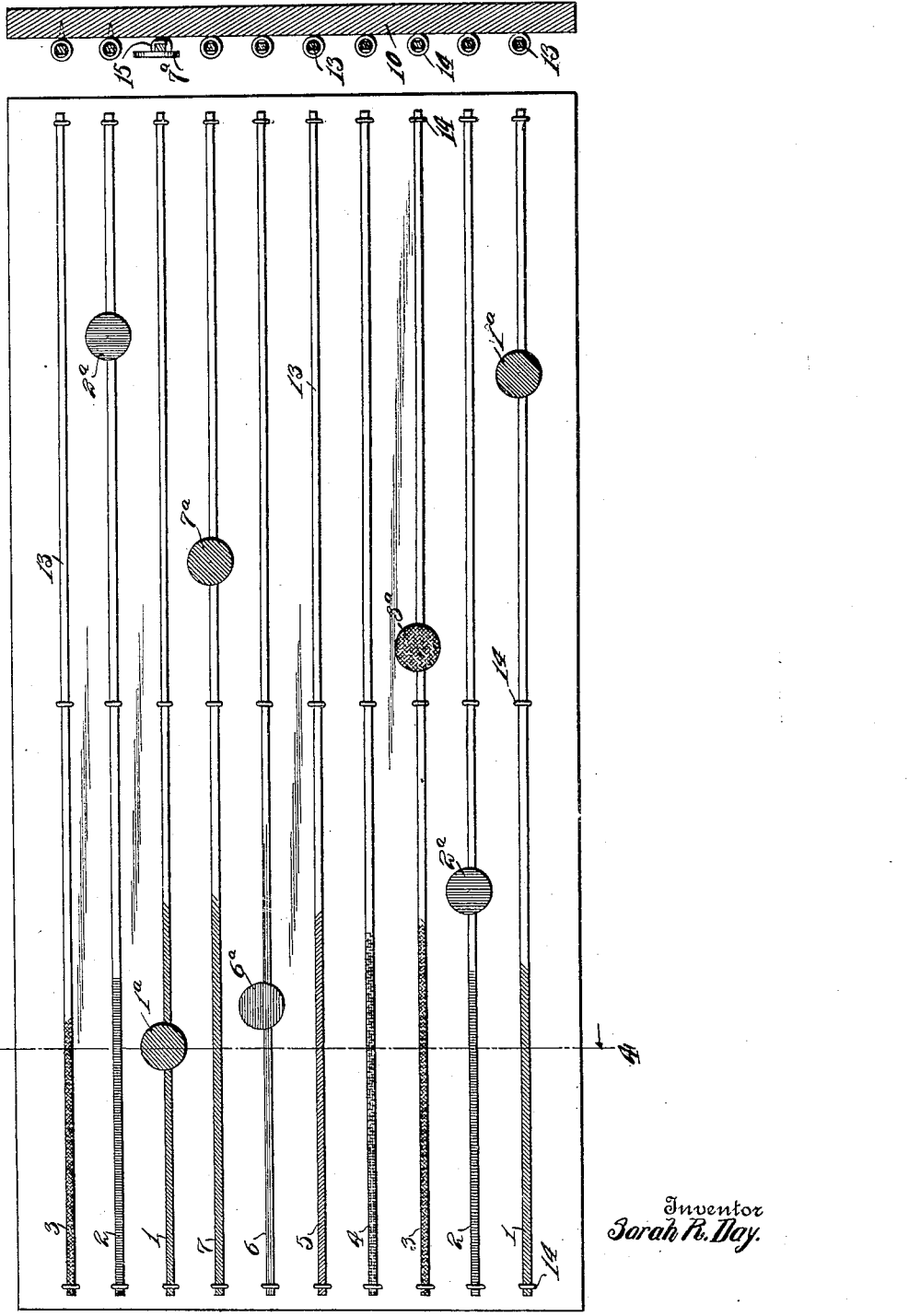

Feb. 18, 1930.　　　S. R. DAY　　　1,747,350
MUSICAL CHART
Filed Oct. 18, 1926　　3 Sheets-Sheet 3
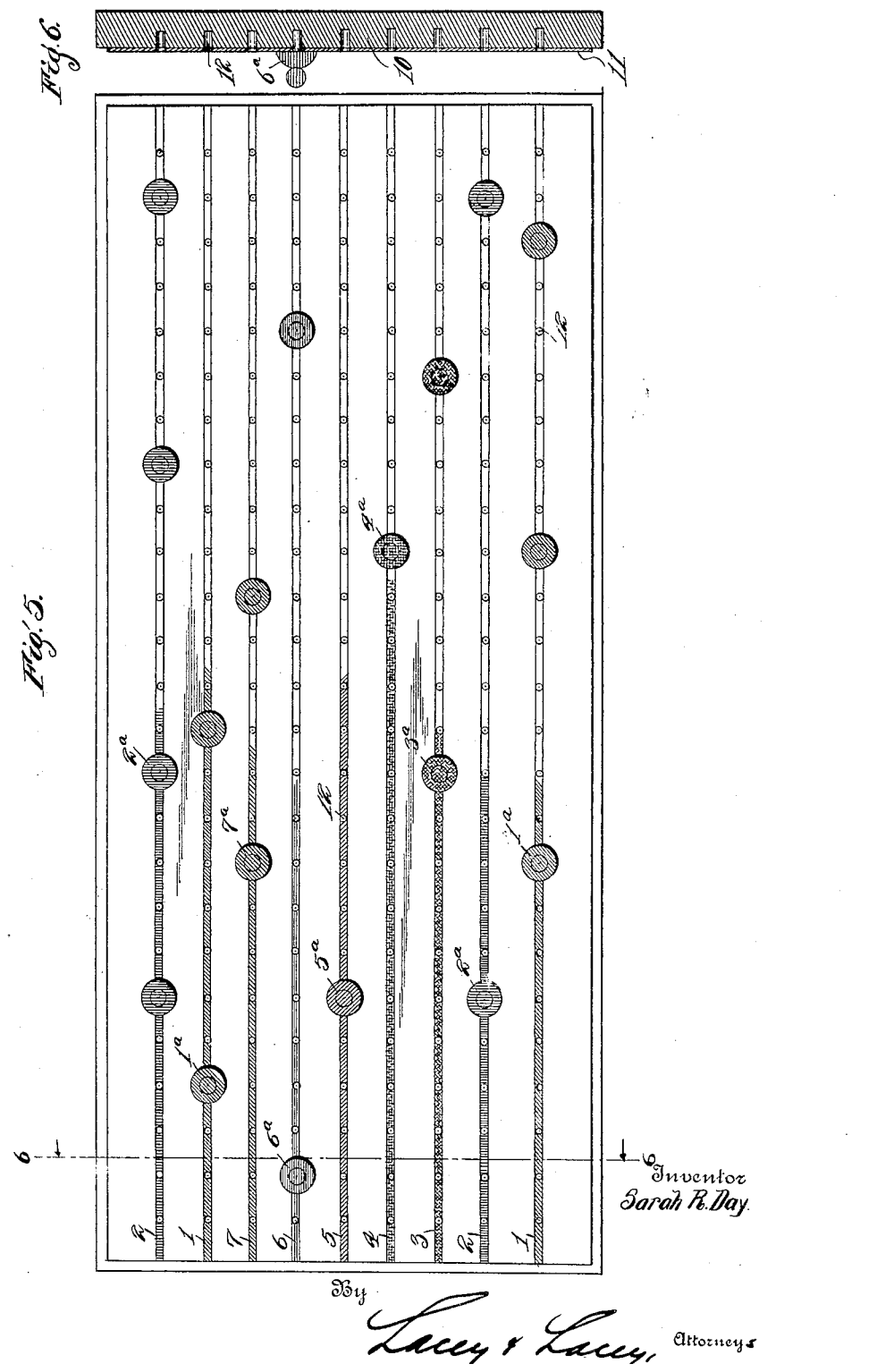
Inventor
Sarah R. Day.
By
Lacey & Lacey, Attorneys Patented Feb. 18, 1930

1,747,350

UNITED STATES PATENT OFFICE

SARAH R. DAY, OF AUSTIN, TEXAS, ASSIGNOR OF ONE-HALF TO OSBOURNE McCONATHY, OF GLEN RIDGE, NEW JERSEY

MUSICAL CHART

Application filed October 18, 1926. Serial No. 142,386.

The invention relates to the teaching of music for children and utilizes colors as representative of tones, thereby facilitating ear training and the recording of sounds, since each particular sound is associated with a selected color.

The invention contemplates a bank of lines not less than seven, uniformly spaced and disposed in parallel relation, each of the lines being broad and of a different color, there being seven colors to correspond with the seven natural tones or sounds, and indicators of like color to match the colors of the several lines so that when associated therewith makes a record.

While the drawings illustrate a preferred embodiment of the invention it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a front view of a musical chart, illustrative of the invention.

Figure 2 is a sectional view on the line 2—2 of Figure 1, looking in the direction of the arrows.

Figure 3 is a view similar to Figure 1, of a modification.

Figure 4 is a sectional view on the line 4—4 of Figure 3, looking in the direction of the arrows.

Figure 5 is a front view of a further modification.

Figure 6 is a sectional view on the line 6—6 of Figure 5, looking to the left as designated by the arrows.

Figure 7 is a detail view of a portion of the lattice showing more clearly the manner of supporting the vertical strips.

Corresponding and like parts are referred to in the following description and designated in the several views of the drawings by like reference characters.

The device comprises a suitable base which may be of any construction and finish according to the required cost and the caprice of the designer and manufacturer. The base presents a bank of horizontally disposed lines which are uniformly spaced and of a breadth to present a color in sharp outline and in a manner to be easily and readily distinguished. Each of the lines is differently colored to distinguish the position of the several lines. There is provided a line for each of the several natural sounds recognized in music, and indicators of a color corresponding to the several lines are provided to be associated with the lines, whereby to record sounds, so that melodies may be recorded by the pupil, without any effort except that required for associating different colors.

The base 10 may consist of a board of any length, width and thickness, and the lines may be painted or applied in different colored strips adhesively secured thereto. As shown in Figures 5 and 6, a sheet 11 is pasted, or otherwise applied to the face of the base 10 and the lines are printed or otherwise applied thereto. For convenience, the bank or group of lines is designated by the numerals 1, 2, 3, 4, 5, 6, and 7, each of the lines being differently colored, the line 1 being purple, the line 2 red, the line 3 orange, the line 4 yellow, the line 5 green, the line 6 blue, and the line 7 lavender, or a lighter tint or hue of purple. Corresponding lines are similarly colored and designated in the several forms to avoid confusion. Openings 12 are formed in the base 10 along the several lines and provide for securing the indicators to the base when applied thereto. The indicators may be of any construction and form, and in the arrangement shown in Figure 5, may consist of buttons having stems which are adapted to be inserted within the openings 12. These indicators are differently colored to match the colors of the several lines, and for convenience they are designated by the numerals $1^a$, $2^a$, $3^a$, $4^a$, $5^a$, $6^a$ and $7^a$, to agree with the respective lines. There will be provided a number of indicators of the same color for each of the lines, so that in recording a melody any given line may have a number of indicators applied thereto. The openings 12 also serve as means to space the indicators to insure a uniform appearance when a melody is recorded by applying indicators to the bank or group of lines appearing on the base 10.

In the form shown in Figures 3 and 4 the lines consist of strips or bars 13, preferably of wood, applied to the base 10 and retained in place by means of screw eyes 14 or other suitable fastening means. These strips or bars are colored in the manner herein stated and the indicators provided to be associated therewith may be of any determinate form and, as shown, consists of disks, each being provided with a hook 15 to engage over the selected strip or bar 13. These indicators are colored to match the color of the several lines. In the form of chart shown in Figures 1 and 2 a lattice work is applied to the base 10 and is spaced therefrom, as indicated most clearly in Figure 2. This lattice work includes horizontal strips or bars 16 corresponding to the lines and vertical strips or bars 17, the several strips or bars being suitably connected at the points of crossing. Other strips or bars 18 are disposed in front of the lattice work and serve as spacers to secure uniformity in the application of the indicators to the horizontal elements 16, representing the lines of the chart. The strips or like spacing elements 18 are suspended from tacks 19 provided along the upper edge of the base 10 and, as a result, the elements 18 may be removed or differently spaced as required. The indicators present the appearance of birds and are colored to agree with the various colors of the individual lines. Hooks 20 applied to the indicators are adapted to engage over the strips or bars 16 and retain the indicators in place.

In the use of the device, the child, or pupil is taught to associate a particular sound with a special color, the instruction being continued until the pupil becomes familiar with the natural tone sounds and is able to associate each particular sound with a given color. When the teacher produces a sound the pupil selects an indicator of a color corresponding with the sound and places such indicator upon a line of the group or bank of lines of the same color to match the indicator and agreeing with the sound to be recorded. This is greatly facilitated as the pupil is not concerned about the relative position of lines and spaces, the only effort required being to match the color of the indicator with the color of the line to which the indicator is to be applied, and when this is effected a record has been made and the pupil can reproduce the sound, or a series of sounds, as recorded by the indicators and the lines upon which the said indicators appear.

The strips 18 are provided at their upper ends with loops 20 to engage the tacks 19. The loops 20 are of a length to prevent disengagement of the strips from the tacks when the strips hang vertically. This is shown most clearly in Figure 7. When engaging or disengaging the strips they are turned to occupy a position about at a right angle to the loops 20. After the loop 20 has been engaged with a tack 19 the strip is permitted to hang vertically and engaging the head of the tack prevents disengagement of the strip therefrom as shown most clearly in Figure 7.

Having thus described the invention, I claim:

1. A music chart comprising a base having a music staff thereon, tacks along the top of the staff, and spacers provided with loops to engage the tacks and cooperate therewith to prevent casual displacement of the spacers.

2. A music chart comprising longitudinal bars forming a music staff, vertical bars connecting the longitudinal bars, tacks along the top longitudinal bar, spacing bars, and loops at one end of the spacing bars to engage selected tacks and coact therewith to prevent casual displacement of the spacing bars when arranged in determinate position.

In testimony whereof I affix my signature.

SARAH R. DAY. [L. S.]